Aug. 20, 1935.   D. C. WEST ET AL   2,011,666
MERCURY ARC RECTIFIER
Filed Sept. 12, 1934   2 Sheets-Sheet 1
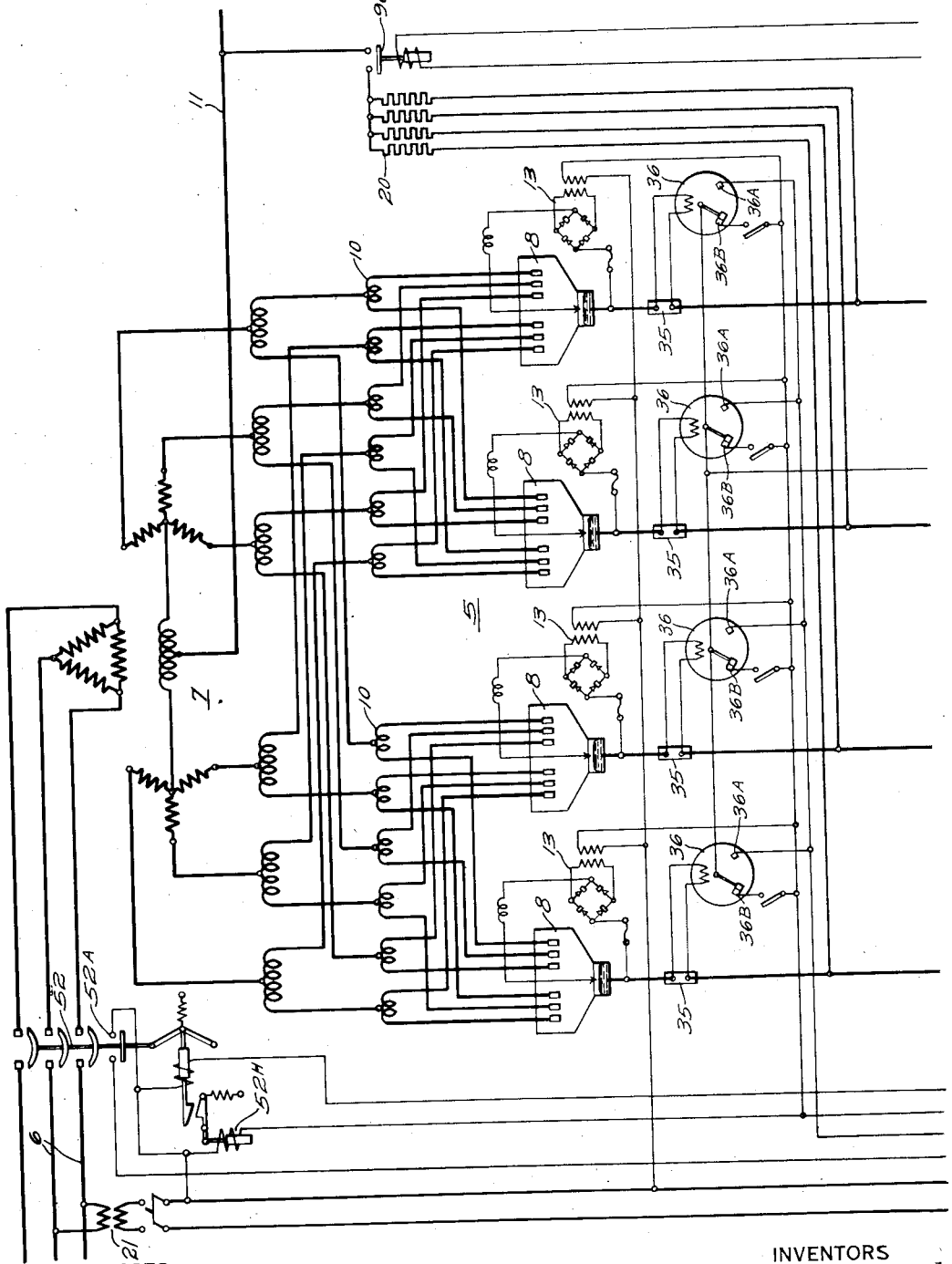
WITNESSES:
C. J. Weller.
S. A. Stricklett
INVENTORS
Donald C. West and
Herbert A. Rose.
BY O. B. Buchanan
ATTORNEY

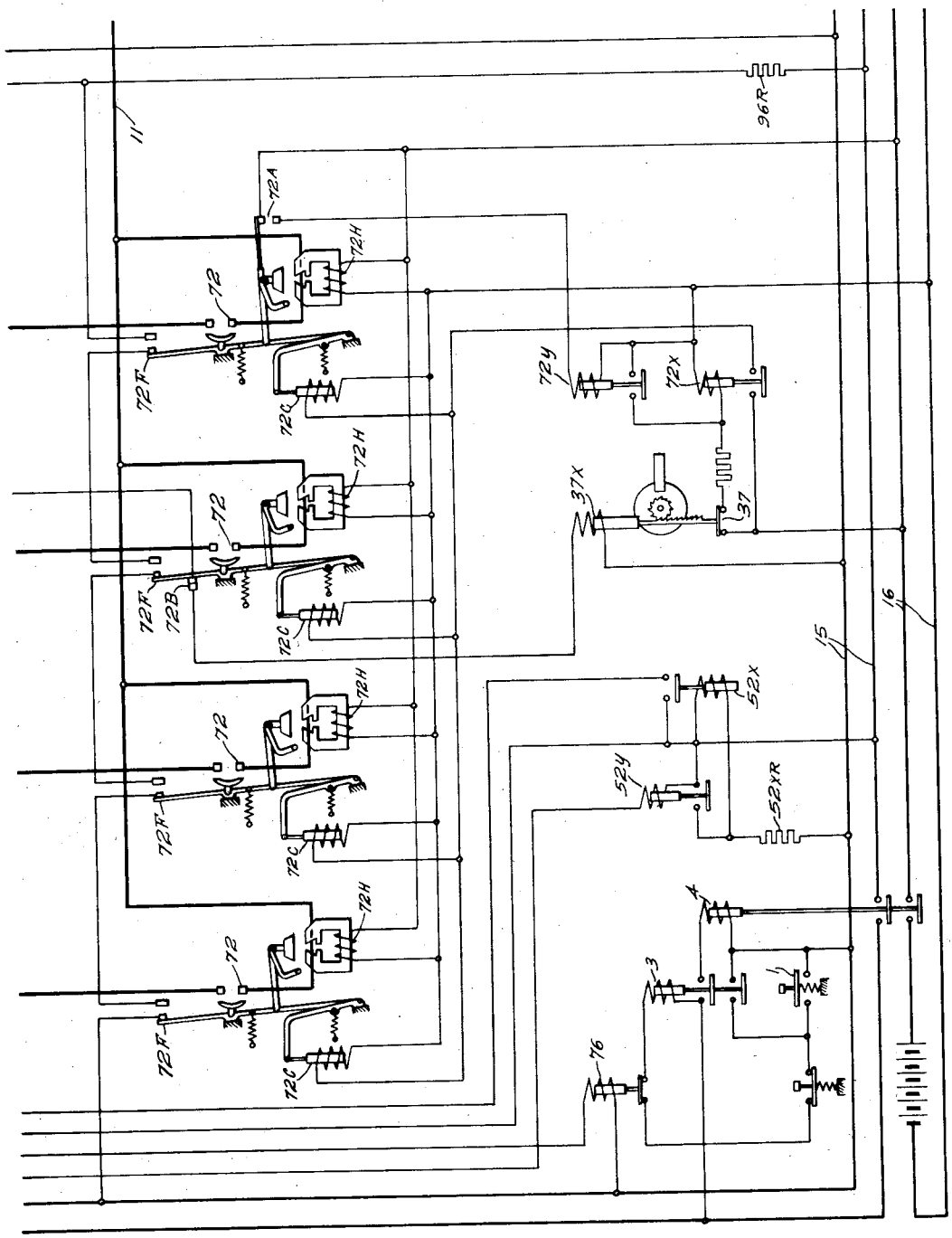

Patented Aug. 20, 1935

2,011,666

UNITED STATES PATENT OFFICE 2,011,666

MERCURY ARC RECTIFIER

Donald C. West and Herbert A. Rose, Forest Hills, Pa., assignors to Westinghouse Electric & Manufacturing Company, East Pittsburgh, Pa., a corporation of Pennsylvania Application September 12, 1934, Serial No. 743,628

10 Claims. (Cl. 175—363)

Our invention relates to a vapor electric converter and particularly to an automatic starting, checking and control system for a sectionalized vapor electric converter.

In a sectionalized vapor electric converter each section of the converter is subject to all of the faults such as inverse arcing, failure of excitation, dropping of load, etc., that an individual converter may experience. Consequently, while operating sectionalized vapor electric converters, it is necessary to constantly check each section of the converter to determine if it is carrying its proportionate share of the load. Also it is desirable in the sectionalized converters when one of the sections is inoperative to maintain the remaining sections in operation so long as it is possible to do so without overloading or otherwise endangering the active sections.

It is an object of our invention to provide an automatic control and checking system to determine the operativeness of each section of the converter and in case any section is inoperative to prevent overloading of the remaining sections.

The control system according to our invention comprises means for connecting the converter to the alternating current line, a dummy load for each section of the converter and a relay responsive to the current flow through the dummy loads for checking the operativeness of the converter. Each section of the converter is provided with a switching device for connecting that section of the converter to the actual load supplied by the device. The checking system operates to maintain the switching devices inoperative until each of the sections supplies load to the dummy or checking load system at which time it automatically connects the converter to the actual load and releases the dummy load circuit. After release of the dummy load, the checking system operates to determine the load condition of each section of the converter. If any section is inoperative, the checking system functions in the event of overload of any of the active sections to disconnect the converter from the load or supply systems.

In certain applications where the converter is subject to restarting after periods of shut-down, the checking load system insures starting of each section of the converter prior to connecting the converter to the bus.

This method of operation stabilizes the sections and insures that all sections will assume load when the main circuit breakers are closed.

In certain applications subject to fluctuating loads, it sometimes happens that one of the sections will not immediately resume load after a zero load interval. In such applications we prefer to utilize a time delay device which will prevent disconnection of the converter in case of an immediate overload on the active sections. The time delay usually permits the inactive section to assume load and prevents shutdowns or service interruptions which would otherwise occur because of a slow firing section.

Other objects and advantages of our invention, will be apparent from the following detail description, taken in conjunction with the accompanying drawings, in which the figure is a schematic illustration of a rectifier system embodying our invention.

The apparatus according to our invention comprises a sectionalized converter 5 connected to an alternating current supply line 6 by a suitable supply transformer 7. While any suitable transformer may be used, we prefer a single transformer 7 and to divide the current between the sections 8 of the converter 5 by means of suitable balancing transformers 10. The transformer 7 is connected to the alternating current system 6 by means of a suitable circuit breaker 52. Each section 8 of the converter 5 is connected to the direct current system 11 by means of a suitable high speed circuit breaker 72. We prefer to provide each section 8 of the converter 5 with its own individual excitation system 13 which is, in turn, supplied from an auxiliary control circuit 15.

In series with each section 8 of the converter 5 is a suitable current responsive relay 36 having a no load or back contact 36B and an overload or front contact 36A.

A suitable checking or dummy load device 20 is connected to each of the sections 8 of the converter 5 and the dummy load system 20 is made operative by the contacts of a relay 96.

In the operation of the converter according to our invention, a suitable control potential is supplied from any desirable source such as an auxiliary transformer 21 connected to the alternating current supply system 6. This control potential is connected to the control circuit 15 by means of a suitable contactor. This contactor may be a manual push button 1 as illustrated, but may be a suitable load responsive device in which case the station will be fully automatic although it may be a semi-automatic device operated by remote control.

When the contactor 1 is closed, it energizes the operating coil of relay 3, which, in turn, closes its contacts locking itself in and energizing the operating coil of relay 4 which closes its contacts and energizes the main control circuit 15 and an auxiliary direct current control circuit 16. The energizing of the main control circuit 15 and the auxiliary circuit 16 energizes the holding coils 52H of circuit breaker 52, the holding coils 72H of the high speed circuit breakers 72, the excitation systems 13 for each section 8 of the converter 5.

At the same time the closing of the contacts of relay 4 supplies energy to the operating coil of relay 52X which closes its contacts and supplies energy to the closing coil of circuit breaker 52. The closing of circuit breaker 52 supplies energy to the supply transformer 7 and an auxiliary contact 52A of the circuit breaker 52 energizes the operating coil 52Y which short circuits the relay 52X and deenergizes the operating coil of relay 52 which is then held closed by holding coil 52H. A suitable resistor 52XR is provided for preventing a short circuit of the control system upon the closing of contact of relay 52Y.

With current supplied to the excitation devices 13 and the supply transformer 7, the converter 5 is ready to deliver current to whatever load is available.

The closing of the contacts of relay 96 connects the dummy load 20 across the converter 5. As each section 8 of the converter 5 picks up the relays 36 open their back contacts 36B so that when all of the back contacts 36B are open, that is, when all the dummy loads 20 are carrying current and each of the sections 8 is delivering current to the dummy load 20, the breaking of the back contacts 36B releases holding coil 37X, relay 37 then closes with a time delay to energize the operating coil of relay 72X, the contacts of which close and energize the cocking coils 72C of circuit breakers 72.

Circuit breakers 72 are of the high speed type in which the cocking of the circuit breaker closes in a magnetic holding circuit through the holding coils 72H and puts the contacts of the 72 breakers in position to close. When the cocking action of the 72 breakers is completed, an auxiliary contact 72A of the slowest breaker energizes the operating coil 72Y which short circuits relay 72X and removes the energy from the cocking coils 72C of 72 breakers. Upon the removal of the energy from the cocking coils 72C, the breakers 72 close simultaneously under spring action, thus connecting the sections 8 of the converter 5 to the direct current or main load system 11.

Auxiliary contactors 72F carried by the circuit breakers 72 operate to short circuit the operating coil of relay 96 which opens its contacts and disconnects the dummy loads 20.

The closing of the breakers 72 also opens back contact 72B and in effect places the operating coil 37X out of circuit, so that the closing of back contact 36B will not operate the operating coils of breakers 72Y definitely leaving the cocking coils 72C out of circuit and preventing any operation of the breakers 72 unless there should be a reverse current through the direct current line 11 associated with the breakers 72.

If, after all of the sections 8 have been connected to the direct current circuit 11, any one of the sections 8 should cease to carry current, the back contact 36B of relay 36 associated with that section would be made. Nothing would then happen unless one of the remaining sections 8 should become overloaded, in which event the front contact 36A of overload contact of relay 36 associated with the overload section 8 would be closed and in conjunction with the back contact 36B of the inoperative section 8 would provide a circuit energizing the operating coil of time delay relay 76 which after a suitable time interval would open its contacts and deenergize the entire control circuit 15, thereby opening all of the contactors 72 and 52 and returning the converter 5 to a normal inoperative condition, after which it may be again started by closing the initial contact 1.

It is thus seen that in a control system according to our invention the converter 5 is automatically checked at all times for operativeness of the sections 8 and prevents the connection of the converter 5 to the load 11 so long as any section 8 remains inoperative and in the event of a section 8 becoming inoperative after the connection to the load 11. An overload on any of the operative sections 8 then actuates a relay 76 which automatically disconnects the entire system.

We have further provided a system which may be manually initiated after which the control is fully automatic or in which the control may be initiated in any desired manner, either semi-automatic or fully automatic as the conditions may warrant. In any event once the initial contactor 1 is closed, the entire operation of the system is controlled by fully automatic means so that manual supervision of the operation of the converter is unnecsssary.

While for purposes of illustration we have shown a specific embodiment of our invention, it will be apparent that changes and modifications can be made therein without departing from the true spirit of our invention or the scope of the claims.

We claim as our invention:

1. A vapor electric current translating system comprising a source of alternating current, a direct current line, a multi-section vapor-electric converter, a transformer for supplying current to said converter, each terminal of said transformer being connected to an electrode in each section of said converter, balancing transformers inserted between said transformer terminals and said electrodes for securing current division therebetween, a circuit breaker for each section of said converter, a dummy load connected to each of said sections, a current responsive means connected to each section of said converter, means responsive to action of said current responsive means for delaying the closing operation of said circuit breakers until each section delivers current to a dummy load, means responsive to release of said delay means for energizing the circuit breakers and means responsive to closing of the circuit breakers for disconnecting the dummy loads.

2. A checking system for a sectionalized vapor electric converter comprising a dummy load connected to each section of said converter, a current responsive relay in series with each section of the converter, a circuit breaker for each section of the converter, no load contacts on each of said current responsive relays and means for preventing the closing of said circuit breakers until all of said sections deliver current to the dummy loads.

3. A checking system for a sectionalized vapor electric converter comprising a dummy load connected to each section of said converter, a current responsive relay in series with each section of the converter, a circuit breaker for each section of the converter, no load contacts on each of said current responsive relays, means for preventing operation of said circuit breakers until all of said sections deliver current to the dummy loads, overload contacts on said current responsive relays, and a relay responsive to an overload on one section while another of said sections fails to carry load for terminating operation of said converter.

4. An automatic vapor electric conversion system comprising a sectionalized vapor electric converter, a transformer for supplying energy to said converter, an excitation system for each section of said converter, a switching device in series with each section of the converter for connecting said converter to a load circuit, a control circuit for said converter, means for energizing said control circuit, switching means responsive to energization of said control circuit for energizing the supply transformer for said converter, a current responsive relay in series with each section of said converter, an artificial load having a section thereof for connection to each section of the converter, a relay responsive to initiate energization of the control circuit for connecting said artificial load to said converter.

5. A control system for a sectionalized vapor-electric converter comprising a control circuit, switching means energized from said control circuit for energizing said converter, a checking load system, a switching device for connecting said checking load to said converter, switching means for connecting said converter to a load circuit, a relay for retaining said switching means inoperative and means responsive to current flow to said checking load for releasing said relay.

6. A control system for a sectionalized vapor-electric converter comprising a control circuit, switching means energized from said control circuit for energizing said converter, a checking load system, a switching device for connecting said checking load to said converter switching means for connecting said converter to a load circuit, a relay for retaining said switching means inoperative and means responsive to current flow to said checking load for releasing said relay, and means responsive to an unbalanced operative condition of said converter for disconnecting it.

7. An electrical conversion system for transferring energy between a polyphase alternating current system and a direct current system comprising a sectionalized vapor-electric converter for controlling the flow of energy between said system, a control circuit, a source of control potential, means for connecting said source to said control circuit, switching means controlled from said circuit for connecting said converter to one of said systems and energizing said converter, a checking load system for said converter and means responsive to flow of current from each section of said converter to said checking load for connecting said converter to the other of said systems.

8. An electrical conversion system for transferring energy between a polyphase alternating current system and a direct current system comprising a sectionalized vapor-electric converter for controlling the flow of energy between said system, a control circuit, a source of control potential, means for connecting said source to said control circuit, switching means controlled from said circuit for connecting said converter to one of said systems and energizing said converter, a checking load system for said converter and means responsive to flow of current from each section of said converter to said checking load for connecting said converter to the other of said systems, means for checking the operative condition of each section of said converter and means controlled by said checking means for determining operation of said converter.

9. A control system for a sectionalized vapor electric converter comprising means responsive to energization of said control system for connecting said converter to a supply system, a checking load connected to said converter, switching means controlled by said control system for connecting said converter to a load system, and means for preventing operation of said switching means until each section of the converter delivers current to the checking load.

10. A control system for a sectionalized vapor electric converter comprising means responsive to energization of said control system for connecting said converter to a supply system, a checking load connected to said converter, switching means controlled by said control system for connecting said converter to a load system, and means for preventing operation of said switching means until each section of the converter delivers current to the checking load, and means responsive to unbalanced load condition of said converter sections for terminating the operation of the converter.

DONALD C. WEST.
HERBERT A. ROSE.